United States Patent
Reidt

(10) Patent No.: US 10,720,859 B2
(45) Date of Patent: Jul. 21, 2020

(54) MOTOR STARTER

(71) Applicant: EATON INTELLIGENT POWER LIMITED, Dublin (IE)

(72) Inventor: Georg Reidt, Swisstal (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/327,342

(22) PCT Filed: Sep. 22, 2017

(86) PCT No.: PCT/EP2017/074007
§ 371 (c)(1),
(2) Date: Feb. 22, 2019

(87) PCT Pub. No.: WO2018/055078
PCT Pub. Date: Mar. 29, 2018

(65) Prior Publication Data
US 2019/0199246 A1 Jun. 27, 2019

(30) Foreign Application Priority Data
Sep. 23, 2016 (DE) .......... 10 2016 118 051

(51) Int. Cl.
*H02P 1/26* (2006.01)
*H02P 1/10* (2006.01)
(Continued)

(52) U.S. Cl.
CPC .......... *H02P 1/10* (2013.01); *H01H 71/1045* (2013.01); *H01H 89/06* (2013.01); *H02P 1/26* (2013.01);
(Continued)

(58) Field of Classification Search
USPC ................................. 318/430, 431
See application file for complete search history.

(56) References Cited

U.S. PATENT DOCUMENTS 5,206,572 A * 4/1993 Farag ................... H02H 7/0822
318/778
5,241,290 A 8/1993 Sehmer et al.
(Continued)

FOREIGN PATENT DOCUMENTS

DE 1440894 A1 3/1969
DE 29508611 U1 8/1995
(Continued)

*Primary Examiner* — Bentsu Ro
(74) *Attorney, Agent, or Firm* — Leydig, Voit & Mayer, Ltd.

(57) ABSTRACT

A motor starter includes: a motor circuit breaker which has an electronic tripping device; a contactor which is correspondingly interconnected to the motor circuit breaker for forming the motor starter; and at least one control line disposed between the motor circuit breaker and the contactor, via which control line a control signal, which is generated depending upon a switching signal for switching the contactor, is transmitted from the contactor to the electronic tripping device. The electronic tripping device generates a tripping signal for switching off a current flow across the switching contact or switching contacts of the motor circuit breaker, depending upon the control signal and current flow across one or more switching contacts of the motor circuit breaker.

10 Claims, 6 Drawing Sheets

(51) Int. Cl.
    *H01H 89/06*     (2006.01)
    *H01H 71/10*     (2006.01)
    H02P 1/00     (2006.01)
    H01H 71/12     (2006.01)
    H02P 1/16     (2006.01)

(52) U.S. Cl.
    CPC ......... *H01H 2071/124* (2013.01); *H02P 1/16* (2013.01)

(56) References Cited

U.S. PATENT DOCUMENTS

| | | | | |
|---|---|---|---|---|
| 5,691,871 | A | * | 11/1997 | Innes ............... H02H 3/044 361/93.2 |
| 5,699,222 | A | * | 12/1997 | Innes ............... H01H 73/14 361/170 |
| 6,278,605 | B1 | | 8/2001 | Hill |
| 7,589,942 | B2 | * | 9/2009 | Kumfer ............ H01H 59/0009 318/474 |
| 2004/0246661 | A1 | | 12/2004 | Busch et al. |
| 2012/0320486 | A1 | | 12/2012 | Lagree et al. |
| 2016/0134208 | A1 | * | 5/2016 | Bock ............... H02P 1/32 318/778 |
| 2016/0134210 | A1 | * | 5/2016 | Bock ............... H01H 9/48 318/739 |

FOREIGN PATENT DOCUMENTS

| | | |
|---|---|---|
| DE | 10102316 A1 | 7/2002 |
| DE | 69723975 t2 | 7/2004 |
| DE | 69832916 T2 | 7/2006 |
| DE | 102007019021 A1 | 11/2007 |

* cited by examiner

MOTOR STARTER

CROSS-REFERENCE TO PRIOR APPLICATIONS

This application is a U.S. National Phase application under 35 U.S.C. § 371 of International Application No. PCT/EP2017/074007, filed on Sep. 22, 2017, and claims benefit to German Patent Application No. DE 10 2016 118 051.3, filed on Sep. 23, 2016. The International Application was published in German on Mar. 29, 2018 as WO 2018/055078 under PCT Article 21(2).

FIELD

The invention relates to a motor starter for electric motors.

BACKGROUND

Contemporary motor starters often consist of a combination of motor circuit breaker and contactor, such as motor starters of the Eaton Corp., which combine a PKZ-type or PKE-type motor circuit breaker with a DILM-type contactor.

The use of electromechanical contactors for turning motors and electrical loads on and off, as in the motor starters explained in the preceding, has been an established technique for decades. Electromechanical contactors, whose mechanical contact elements withstand high short-circuit currents and, in the deactivated state, disconnect the electrical load from the voltage source at all poles and galvanically, may be produced economically.

Semiconductor switches—so-called solid state relays (SSR's) or solid state contactors (SSC's)—are also increasingly used for switching electrical loads. For example, these were and are used as unipolar semiconductor switches for frequent connection and disconnection of resistive loads, such as damper registers or IR power radiators. By continuously further developing power semiconductors such as thyristors and TRIAC's, these have become increasingly more voltage-stable and also increasingly have smaller power losses.

Meanwhile, pure semiconductor switches are also available as a replacement for conventional contactors for switching motors in certain power ranges, e.g., DRC-type semiconductor contactors from the company Crydom, Inc., San Diego, U.S.A., or RGCM-type semiconductor contactors from Carlo Gavazzi GmbH. Such semiconductor switches have some advantages and disadvantages as compared to conventional contactors: Advantages are, above all, the lack of mechanical wear on the switching contacts, and thus a high number of possible connection and disconnection processes, rapid connection and disconnection, and possible integrated phase switching—for example, in order to operate a motor, even in a reversing contactor circuit, in the same form factor of, in particular, a 45 mm housing width. It is disadvantageous that, when switching off, no galvanic isolation is established; in the connected state, a certain power loss, and therefore waste heat, are produced that must be removed via suitable measures, e.g., the use of heat sinks; and a lower short-circuit resistance and switching performance.

SUMMARY

In an embodiment, the present invention provides a motor starter, comprising: a motor circuit breaker which has an electronic tripping device; a contactor which is correspondingly interconnected to the motor circuit breaker for forming the motor starter; and at least one control line disposed between the motor circuit breaker and the contactor, via which control line a control signal, which is generated depending upon a switching signal for switching the contactor, is transmitted from the contactor to the electronic tripping device, wherein the electronic tripping device is configured to generate a tripping signal for switching off a current flow across the switching contact or switching contacts of the motor circuit breaker, depending upon the control signal and current flow across one or more switching contacts of the motor circuit breaker.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
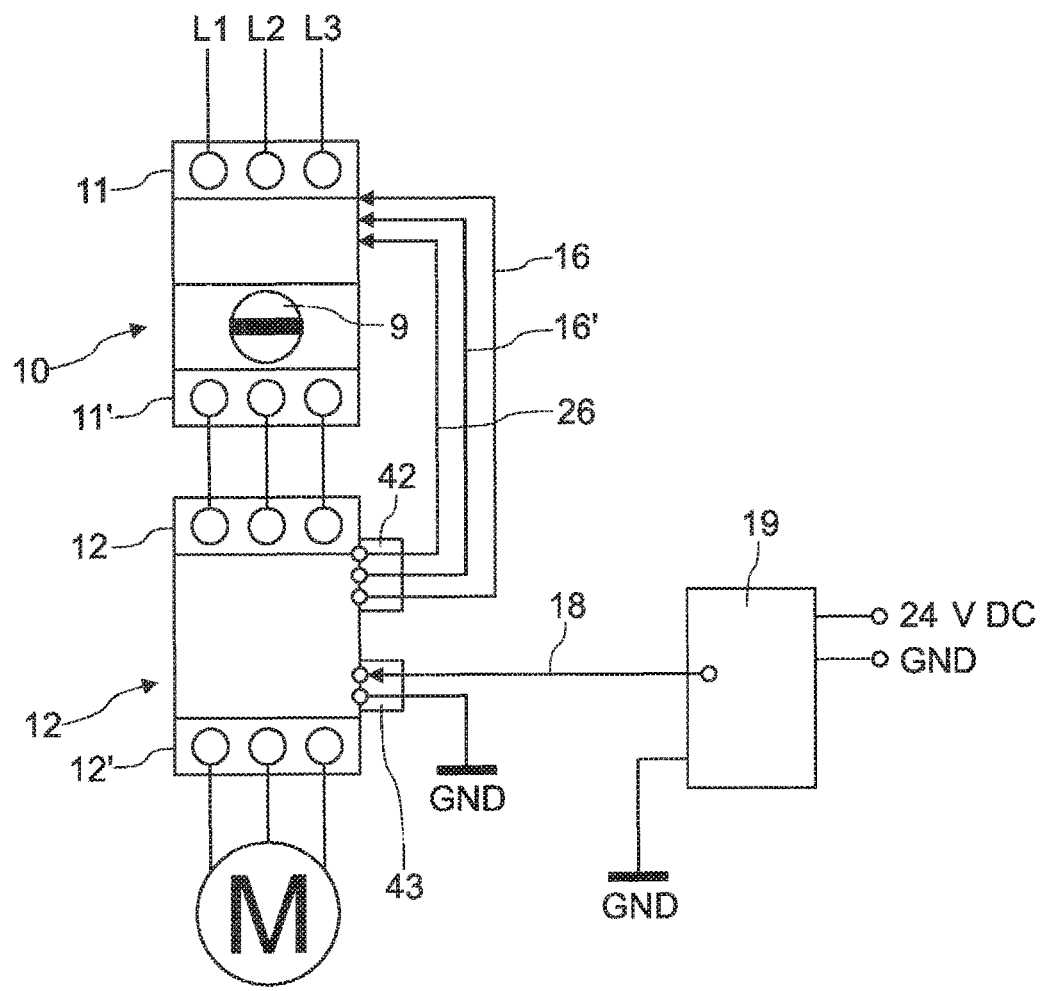
FIG. 1 shows a block diagram of an exemplary embodiment of a motor starter according to the invention, and the interconnection of the motor circuit breaker and of the contactor of this motor starter.

In an embodiment, the present invention provides a motor starter that is suitable, in particular, for use with semiconductor switches.

One idea underlying the present invention idea is to implement a protective function in a motor starter, which protective function enables the motor load to be disconnected even if the contactor, due to a defect, can no longer produce a disconnection. Especially in semiconductor contactors, such a defect may occur via a breakdown. In a conventional motor circuit breaker/contactor combination, in case of such a fault, a disconnection normally does not take place, since this fault is not detected, and also no detection is provided; rather, only faults of the motor load such as, for example, a short circuit in the motor are detected and lead to a load disconnection via the motor circuit breaker.

An embodiment of the invention now relates to a motor starter having a motor circuit breaker, which has an electronic tripping device, and having a contactor which is correspondingly interconnected to the motor circuit breaker to form the motor starter. According to the invention, at least one control line is provided between the motor circuit breaker and the contactor, via which control line a control signal, which is generated depending upon a switching signal for switching the contactor, is transmitted from the contactor to the electronic tripping device, and the electronic tripping device is designed to generate a tripping signal for switching off the current flow across the switching contact or the switching contacts of the motor circuit breaker, depending upon the control signal and current flow across one or more switching contacts of the motor circuit breaker. With a relatively small cost in terms of circuitry, the fault case may thereby be covered in which the switching contacts of the contactor will not be or are not opened, in spite of a switching signal for switching off the motor load.

The motor starter may have an electrical energy storage—in particular, a buffer capacitor for supplying power to the electronic tripping device. The motor circuit breaker may thereby also be tripped in the event that the electrical power available for tripping, which is normally obtained via a current transformer in the motor circuit breaker, is not sufficient. As an external unit, the electrical energy storage may be provided in addition to the contactor and motor circuit breaker, or it may be integrated into the contactor or the motor circuit breaker. For example, the contactor may have the electrical energy storage, which is charged by the switching signal, and an auxiliary power line may be provided between the motor circuit breaker and contactor, via which the electrical energy storage may supply the electronic tripping device with power. Sufficient power for tripping may then be provided via the additional energy provided via the auxiliary power line from the buffer capacitor. Alternatively, the motor circuit breaker may also have the electrical energy storage that is charged by the control signal generated for switching the contactor.

Furthermore, the contactor may have a programmable unit—in particular, a microcontroller—and control electronics coupled to the programmable unit for controlling one or more switching contacts of the contactor, depending upon the switching signal, and the programmable unit may be configured such that it generates the control signal for the electronic tripping device, depending upon data of the control electronics for switching of the switching contact or switching contacts of the contactor, and transmits said control signal via the at least one control line, according to a predetermined data communication protocol, to a data interface, provided for data communication and coupled with the electronic tripping device, of the motor circuit breaker. This enables, for example, the use of the aforementioned PKE-type motor circuit breaker with data interface in the motor starter according to the invention.

The contactor may have, per phase, at least one semiconductor switch as a switching contact.

For example, a PKE-type motor circuit breaker may be combined with a semiconductor contactor in order to provide a motor starter with optimally compact dimensions. The space requirement of a reversing starter may be reduced from an overall width of 90 mm to an overall width of 45 mm via the use of the semiconductor contactor. However, this advantage of overall width reduction is not present in the case of a direct starter. Such a device combination therefore requires just as much space as a conventional combination of, for example, a PKE-type motor circuit breaker with a DILM-type contactor. This problem may be solved by a motor starter being constructed from the combination of a PKE-type motor circuit breaker with a semiconductor contactor so that the motor circuit breaker is mounted on the semiconductor contactor, similarly to what is known from German utility model DE 295 08 611 U1. Installation space, and thus area on the mounting plate of a switch cabinet, may thereby be saved. Accordingly, the contactor may have a fastening element, on its front side, to which the motor circuit breaker can be fastened with its underside. In order to be able to efficiently remove the waste heat generated by the power loss in the semiconductor contactor, a cooling module may additionally be provided which has a second fastening element, on its rear side, for switch cabinet mounting and a third fastening element, on its front side, to which the contactor can be fastened with its underside.

The motor circuit breaker may have at least one current flow measuring device—in particular, a current transformer, and a measuring and power supply circuit, fed on the input side by the one or more current flow measuring device, for supplying power to the electronic tripping device, and an actuator for actuating the switching contact or switching contacts of the motor circuit breaker. This enables both a measurement of the current flow via the switching contacts of the motor circuit breaker and the generation of energy which is required for a tripping/switch-off/load separation operation by the motor circuit breaker.

A further embodiment of the invention relates to a contactor that is designed for use in a motor starter according to the invention and as described herein, and which has an interface for the at least one control line for transmitting a control signal, which control signal is generated depending upon a switching signal for switching the contactor, to an electronic tripping device of a motor circuit breaker.

The contactor may have an electrical energy storage—in particular, a buffer capacitor—that is charged by the switching signal, and the interface may have a connection for an auxiliary power line between motor circuit breaker and contactor, via which the electrical energy storage may supply the electronic tripping device with power.

The contactor may have a programmable unit—in particular, a microcontroller—and control electronics coupled to the programmable unit for controlling one or more switching contacts of the contactor, depending upon the switching signal, and the programmable unit may be configured such that it generates the control signal for the electronic tripping device, depending upon data of the control electronics for switching of the switching contact or switching contacts of the contactor, and transmits said control signal via the at least one control line, according to a predetermined data communication protocol, to a data interface, provided for data communication and coupled with the electronic tripping device, of the motor circuit breaker.

The contactor may have, per phase, at least one semiconductor switch as switching contact and/or a fastening element, on its front side, to which the motor circuit breaker can be fastened with its underside.

In the following description, identical, functionally-identical, and functionally-interrelated elements may be provided with the same reference numbers. Absolute values are indicated in the following only by way of example, and are not to be understood as limiting the invention.

FIG. 1 shows a three-phase motor starter for a three-phase motor M. The motor starter has a motor circuit breaker 10, e.g., the aforementioned PKE-type circuit breaker, and a contactor 12. The motor circuit breaker 10 is connected to the three phases L1, L2, L3 of a power supply via terminals 11 in the usual manner. The mains terminals of the motor M are connected to corresponding terminals 12' of the contactor 12. The other terminals 12 of the contactor are wired to the terminals 11' of the motor circuit breaker 10. The three internal switching contact pairs (one switching contact pair per phase) are opened or closed via a rotary switch 9. In addition, the motor circuit breaker 10, internally, has protection devices for switching off the motor, e.g., in the event of overload or short circuit, which will be described in detail below with reference to FIGS. 3 and 4.

The motor M is started via the contactor 12, given closed switching contacts of the motor circuit breaker 10. For this purpose, the contactor 12 has an interface 43 for supplying a switching signal 18 that, for example, may be generated by a PLC (programmable logic controller) 19. The PLC 19 is supplied from a 24 V DC direct voltage (relative to the potential GND) and has a 24 V DC switching output to which the control signal 18 is applied (0 V/24 V DC). If the switching contacts of the contactor 12 are to be opened, i.e., if the contactor 12 is to be switched off, the PLC 19 outputs 0 V as a switching signal. To close the switching contacts of the contactor 12, the PLC 19 outputs a 24 V DC switching signal 18. Of course, other voltage values for opening and closing the switching contacts of the contactor 12 are conceivable—for example, precisely the opposite of 0 V for closing and 24 V DC for opening.

The contactor 12 may be implemented as an electromechanical contactor, a semiconductor contactor, or as a hybrid contactor (electromechanical contactor combined with semiconductor switches).

Without additional protective measures, the motor load is switched off only by the motor circuit breaker 10, viz., in the event of an overload detected by the motor circuit breaker 10 or a detected short circuit. If an electrical defect occurs in the contactor 12—for example, a breakdown in a semiconductor contactor or a short circuit in the contactor 12, due to which the switching contacts of the contactor remain permanently closed—the motor load can no longer be switched off by the PLC 19 via the switching signal 18. In the event of such a defect of the contactor 12, the motor M then runs continuously. As explained above, the motor circuit breaker 10 then switches off only in the event of an overload situation or a short circuit in the motor M.

In order to enable the motor load to be switched off even in the event of a defect of the contactor 12, an additional switching element and a current measuring device, for example, could be provided, so that, given a current flow across the contactor 12 in spite of switching signal 18 for switching off said contactor 12, said current flow being detected by the current measurement device, the additional switching element, which is controlled accordingly by the current measuring device, switches off the current flow through the motor windings.

In order to minimize the cost for such a shutoff, according to the invention, the current flow measurement device that is present anyway in a motor circuit breaker 10 is used, and the circuit breaker is configured such that, via corresponding interconnection with the contactor 12, a shutoff may take place, even given an electrical defect of said contactor 12, viz., specifically controlled via a corresponding control signal that may be generated by the contactor 12, even in the event of a defect, and is transmitted from the contactor 12 to the motor circuit breaker 10 via additional lines 16, 16' between an interface 42 of the contactor 12 and corresponding inputs of the motor circuit breaker 10. A further line 26 may be provided between the interface 42 of the contactor 12 and the motor circuit breaker 10 for transmitting auxiliary power, which is additionally available to the motor circuit breaker 10 for switching off or opening contacts.

The circuit design for the motor starter according to the invention will now be explained in detail in the following, using additional exemplary embodiments.

Figure 2:
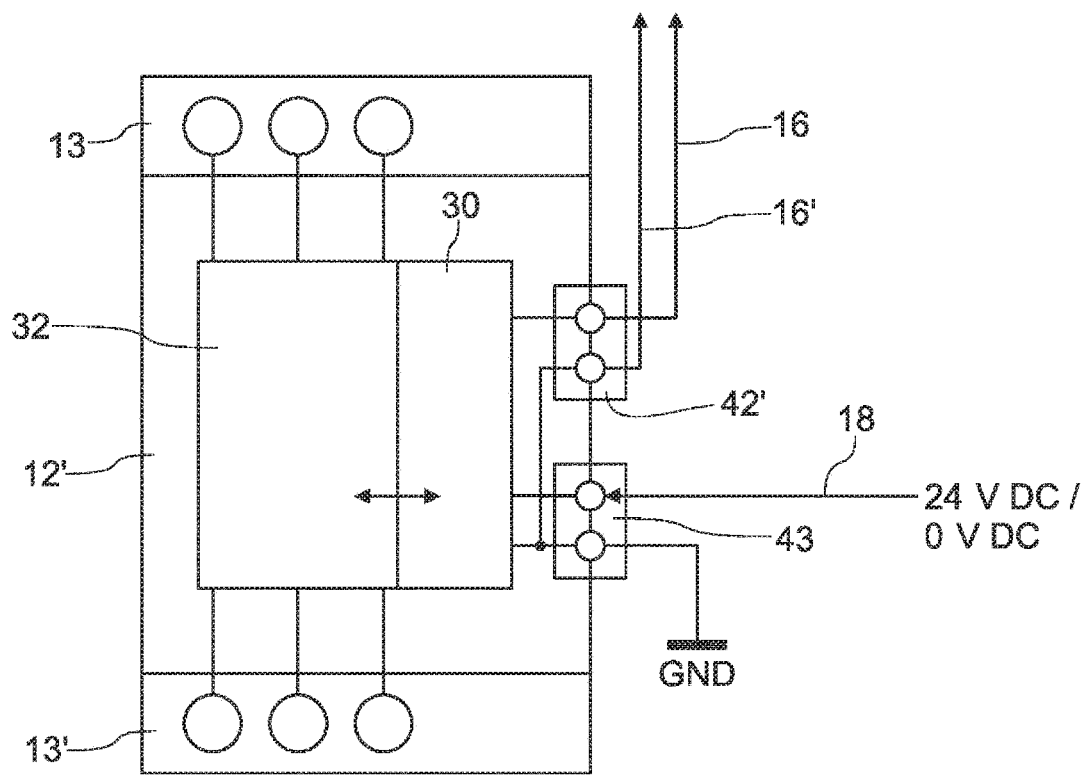
FIG. 2 shows a block diagram of an exemplary embodiment of a contactor designed for use in a motor starter according to the invention.

FIG. 2 shows a semiconductor contactor 12' that is specifically designed for use in the motor starter according to the invention and, for this, has control electronics 30 for controlling the switching contacts 32 of the contactor 12', said switching contacts being implemented as semiconductor switches. The switching contacts 32 may, for example, be implemented via thyristors, TRIAC's, or power transistors (e.g., bipolar power transistors, power MOSFET's, insulated gate bipolar transistors IGBT's) whose control inputs are controlled by the control electronics 30 and whose power paths are connected between the terminals 13 and 13'. The semiconductor contactor 12' also has the aforementioned interface 42 for connecting the control lines 16, 16', via which the control signal that is generated depending upon the switching signal 18 is transmitted to the motor circuit breaker 10. In the depicted semiconductor contactor 12', the control signal is generated directly by the switching signal 18, i.e., the control signal here corresponds to the switching signal 18, as shown by the interconnection of the interface 42 to the interface 43 for the switching signal 18. The control signal therefore indicates to the motor circuit breaker 10 when an activation command of the semiconductor contactor 12' is present.

Three essential operating states of the motor starter may be differentiated that may occur and are essential for the processing of the control signal by the motor circuit breaker 10:

Normal operating state, no fault in contactor 12':

| Switch off motor load: Switching signal = 0 V | Switching contacts 32 of the contactor are open -> no current flow is possible between the contacts of the terminals 13 and 13' | Line 16, 16' supplies 0 V as control signal to the motor circuit breaker 10 | Error-free operating state |
|---|---|---|---|
| Activate motor load: Switching signal = 24 V (or 12 V or 5 V) DC | Switching contacts 32 of the contactor are closed -> current flow is possible between the contacts of the terminals 13 and 13' | Line 16, 16' supplies 24 V DC as control signal to the motor circuit breaker 10 | Error-free operating state |

If the fault case now occurs, in which one or more of the semiconductor switches 32 are defective and permanently closed—in particular, have broken down—and, because the semiconductor contactor 12' has one or more short circuits between contacts of the connection terminals 13 and 13', the motor load can no longer be switched off by the contactor 12', the following signal combination results:

| Switch off motor load: Switching signal = 0 V | Switching contacts 32 of the contactor are closed due to defect of the semiconductor contactor -> current | Line 16, 16' supplies 0 V as control signal to the motor circuit breaker 10, which motor circuit breaker 10, however, detects a | Operating state is incorrect; motor circuit breaker must trip in order |

-continued

| flow is possible between the contacts of the terminals 13 and 13' in spite of "Switch off motor" command | current flow between the contacts of its terminals 11, 11', although the 0 V control signal is present | to disconnect the motor load from the network |
|---|---|---|

In the above fault case, the motor circuit breaker 10 can now disconnect the circuit and switch off the motor load. The tripping takes place in that the electronic tripping device of the motor circuit breaker 10 is designed to generate a tripping signal, depending upon the control signal transmitted via the lines 16, 16' and the current flow across the switching contacts of the motor circuit breaker 10, with which tripping signal current flow across the switching contacts of the motor circuit breaker 10 may be switched off; a tripping of the motor circuit breaker thus takes place as in a fault case in the motor, but initiated by a fault case in the contactor 12.

Figure 3:
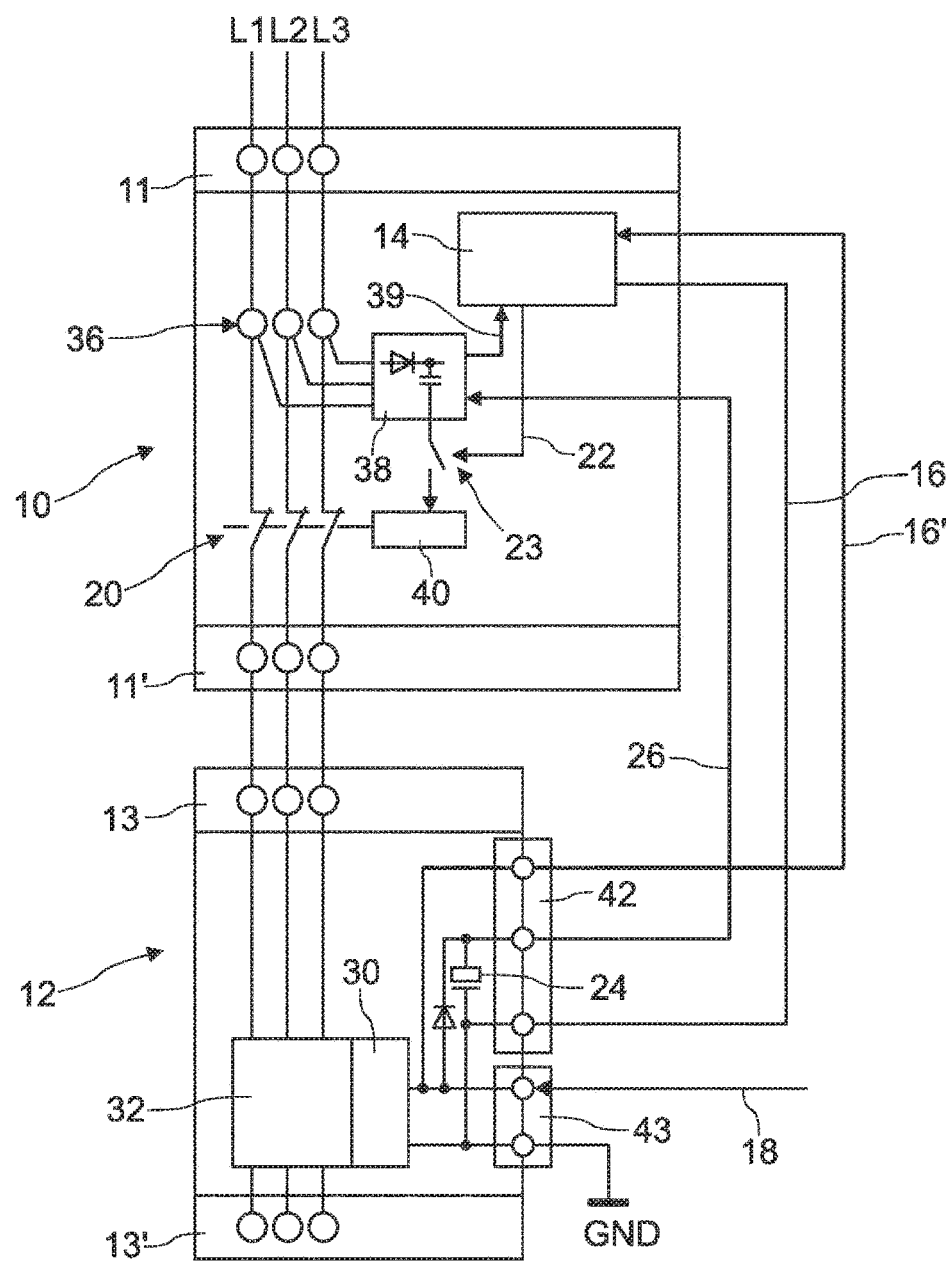
FIG. 3 shows a block diagram of a second exemplary embodiment of a motor starter according to the invention, and the interconnection of the motor circuit breaker and of the contactor of this motor starter, which comprises an auxiliary power line.

The circuit engineering required for this in the motor circuit breaker 10 is shown in detail in FIG. 3: The control signal transmitted via the lines 16, 16' and relative to the reference potential GND is received by an electronic tripping device 14 of the motor circuit breaker 10. The current flow across the switching contacts 20 of the motor circuit breaker 10 is measured via current transformers 36 (one current transformer per phase in FIG. 3; other current flow measuring devices or fewer current transformers, e.g., one for all phases, are also possible). The measured values or measured signals of the current transformers 36 are supplied to a measuring and power supply circuit 38, which is provided for supplying power to an actuator 40 for opening and closing the mechanical switching contacts 20. An output signal 39 of the measuring and power supply circuit 38, which signals a current flow via one or more of the switching contacts 20, is supplied to the electronic tripping device 14, which generates a tripping signal 22 if the 0 V control signal is present (i.e., "Switch off motor load" has been signaled via the switching signal 18), and, nevertheless, the output signal 39 signals a current flow. The tripping signal 22 actuates a switch 23 in order to trip the actuator 40. The switching contacts 20 are thereby opened, and the current flow via the motor circuit breaker 10 is interrupted, i.e., the motor load is switched off. The actuation of the switch 23 consists, in particular, of a chronological closing and subsequent opening, in order to be able to trip the actuator 40. It is functionally coupled to the switching contacts 20 via a switch latch. If the switch 23 for opening the switching contacts 20 is closed, the actuator 40 is energized and may then open the switching contacts 20; after tripping, the switch 23 is opened again so that the actuator is no longer energized. By contrast, if the switching contacts 20 are open in the normal position of the actuator 40, these may be closed again by the actuation of the rotary switch 9, wherein, at the same time, the actuator 40 is pre-stressed again for a possible additional tripping.

Since the tripping energy of the motor circuit breaker 10 is normally generated via the current transformers 36, with smaller load currents, it may be that the energy for tripping is insufficient. In this instance, although the tripping device 14 knows that it should trip, it cannot realize this due to too little available energy. In order to cover this instance, according to the invention, a buffer capacitor 24 as an electrical energy storage may additionally be provided in the contactor 12, which buffer capacitor 24 provides additional energy for the tripping via an additional auxiliary power line 26 from the interface 42 of the contactor 12 to the motor circuit breaker 10. For this purpose, the buffer capacitor 24 is connected between the two terminals of the interface 43 and therefore is charged via the switching signal 18 as long as this is 24 V DC, i.e., "Turn on motor load" is signaled. In practice, the buffer capacitor then lies between the reference potential GND and 24 V DC. A diode connected between the 24 V DC switching signal and a terminal of the buffer capacitor 24 ensures that the buffer capacitor 24 cannot discharge if the switching signal is 0 V. The potential GND, which is also available to the motor circuit breaker 10 via the line 16', is always used as a reference potential.

Figure 4:
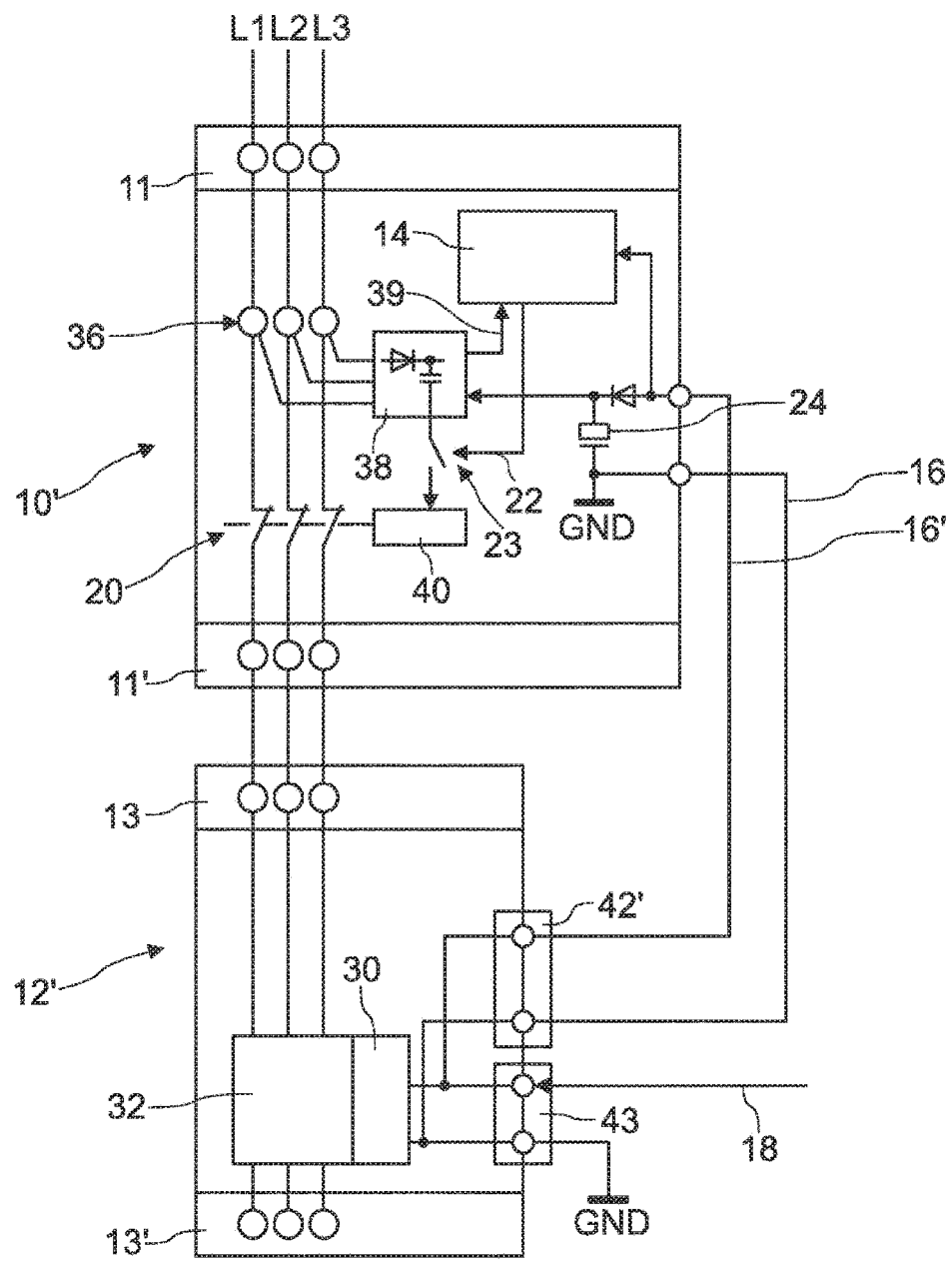
FIG. 4 shows a block diagram of a third exemplary embodiment of a motor starter according to the invention, and the interconnection of the motor circuit breaker and of the contactor of this motor starter.

FIG. 4 shows an implementation in which the buffer capacitor 24 is arranged in the motor circuit breaker 10. As depicted, in this implementation, only two lines 16, 16' are necessary between the interface 42 of the contactor 12' and the motor circuit breaker 10'; the auxiliary power line 26 thus may be omitted. However, the interconnection cost between contactor 12' and motor circuit breaker 10', which interconnection cost is reduced relative to the implementation from FIG. 3, requires a modified motor circuit breaker 10' with installed buffer capacitor 24 as depicted in FIG. 4.

Figure 5:
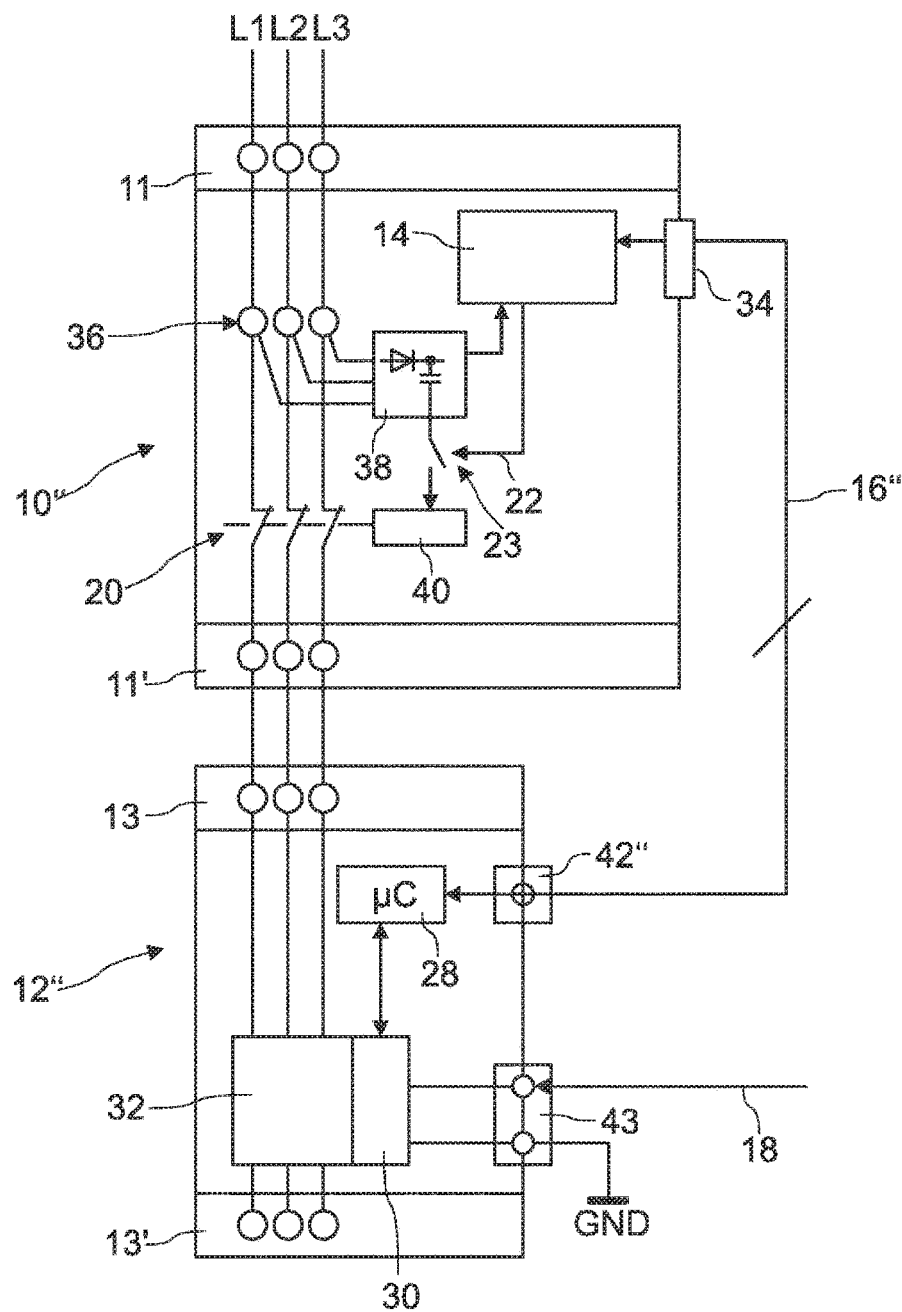
FIG. 5 shows a block diagram of a fourth exemplary embodiment of a motor starter according to the invention, and the interconnection of the motor circuit breaker and of the contactor of this motor starter, wherein a conventional PKE-type motor circuit breaker is used.

FIG. 5 shows an implementation with the aforementioned PKE-type motor circuit breaker 10, which has a communication-capable data interface 34. In order to also be able to realize the motor starter according to the invention with such a motor circuit breaker 10", a semiconductor contactor 12" is used that has a microcontroller μC 28 as a programmable unit. The microcontroller 28 is configured such that it generates the control signal for the electronic tripping device 14, depending upon data of the control electronics 30 of the contactor for switching the switching contacts 32 of the contactor 12", and transmits said control signal via a control line 16", e.g., implemented as a flat ribbon data cable, that is connected between a corresponding interface 42" of the contactor 12' and the data interface 34 of the motor circuit breaker 10". The data are transmitted according to a data communication protocol that is predetermined by the data interface 34 of the motor circuit breaker 10". A possible buffer capacitor, as has been depicted in FIG. 3 and FIG. 4, may likewise be present here as an energy storage.

Figure 6:
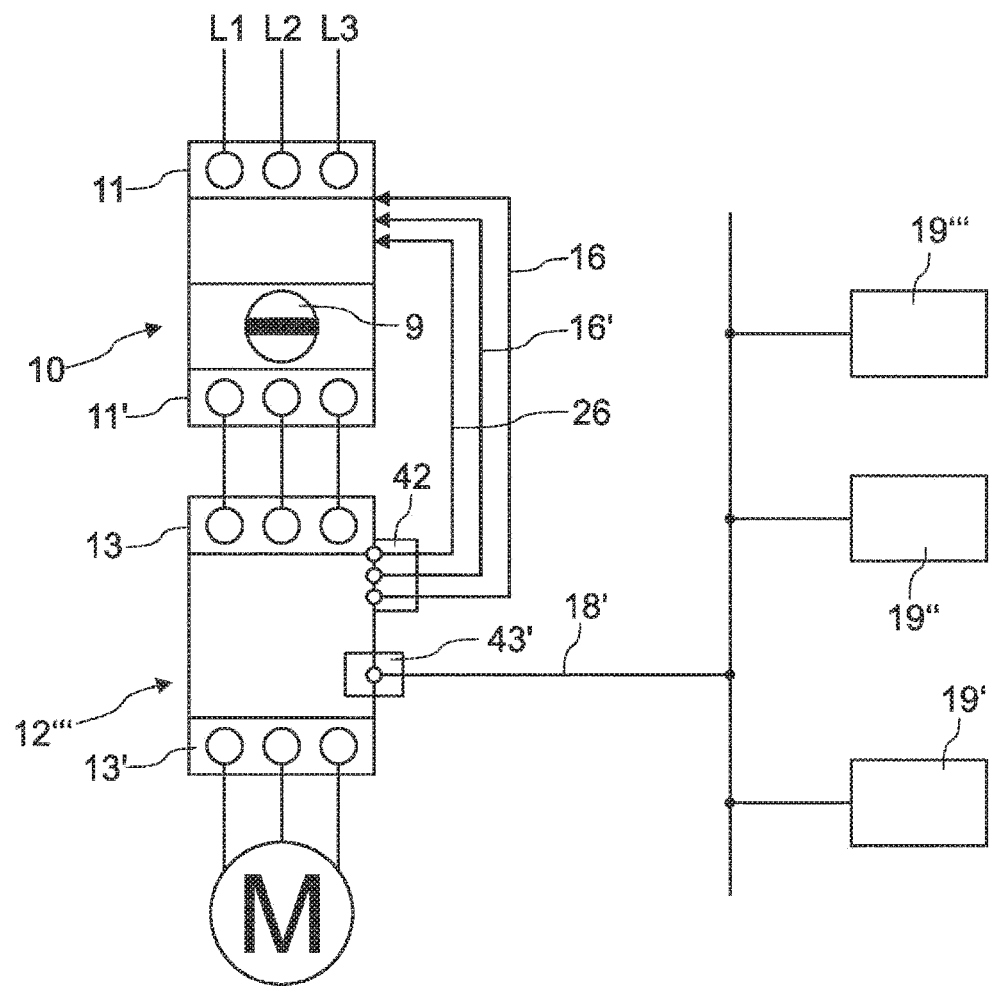
FIG. 6 shows a block diagram of a fifth exemplary embodiment of a motor starter according to the invention, and the interconnection of the motor circuit breaker and of the contactor of this motor starter, wherein the contactor has a fieldbus data interface for controlling the contactor function.

FIG. 6 shows an implementation with, for example, the aforementioned PKE-type motor circuit breaker 10 and a contactor 12''' having a fieldbus data interface 43'. The fieldbus data interface 43' may, for example, be designed for connection to and for data communication via a bus system, which is based upon the SmartWire-DT® technology from the Eaton Corp. and/or the Profibus-DP/AS-interface/Modbus (for example, in RTU mode)/IO-Link standard. The interface 43' may also be designed for data communication by means of several different bus protocols according to the aforementioned standards, so that the contactor 12''' may be operated universally in different bus systems. The implementation shown in FIG. 6 differs from that shown in FIG. 1 essentially in the control of the "On/Off" contactor function via the data interface 43', and via the possibility of providing an auxiliary voltage. Whereas the on/off contactor function is controlled via a PLC 19 in FIG. 1, in the implementation shown in FIG. 6, the "On/Off" contactor function takes place via the fieldbus 18', to which a fieldbus master 19' is connected that may control several field bus slaves 19", 19'''. In this implementation, the contactor 12''' likewise acts as a fieldbus slave, which may be controlled by the fieldbus master 19' like the other fieldbus slaves 19" and 19'''. An electrical energy storage such as the buffer capacitor 24 of the implementations of FIGS. 3 and 4 may be omitted if, for example, the contactor 12'" is equipped with a data interface for SmartWire-DT®, since, in this instance, a continuous supply with auxiliary power is ensured.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A motor starter, comprising:
   a motor circuit breaker which has an electronic tripping device;
   a contactor which is correspondingly interconnected to the motor circuit breaker for forming the motor starter; and
   at least one control line disposed between the motor circuit breaker and the contactor, via which control line a control signal, which is generated depending upon a switching signal for switching the contactor, is transmitted from the contactor to the electronic tripping device,
   wherein the electronic tripping device is configured to generate a tripping signal for switching off a current flow across the switching contact or switching contacts of the motor circuit breaker, depending upon the control signal and current flow across one or more switching contacts of the motor circuit breaker.

2. The motor starter according to claim 1,
   wherein
   the motor starter has an electrical energy storage configured to supply power to the electronic tripping device.

3. The motor starter according to claim 2,
   wherein
   the contactor has the electrical energy storage which is charged by the switching signal, and an auxiliary power line is provided between the motor circuit breaker and contactor, via which the electrical energy storage is configured to supply the electronic tripping device with power, or
   wherein the motor circuit breaker has the electrical energy storage that is charged by the control signal generated for switching the contactor.

4. The motor starter according to claim 1,
   wherein
   the contactor comprises has a programmable unit and control electronics, coupled to the programmable unit, configured to control one or more switching contacts of the contactor, depending upon the switching signal, and
   wherein the programmable unit is configured to generate the control signal for the electronic tripping device, depending upon data of the control electronics for switching the switching contact or contacts of the contactor, and to transmit the control signal via the at least one control line, according to a predetermined data communication protocol, to a data interface, provided for data communication and coupled with the electronic tripping device, of the motor circuit breaker.

5. The motor starter according to claim 1,
   wherein
   the contactor has, per phase, at least one semiconductor switch as a switching contact.

6. The motor starter according to claim 1,
   wherein
   the contactor has a first fastening ement, on its front side, to which the motor circuit breaker is fastenable with its underside, and
   wherein a cooling module is provided that has a second fastening element, on its rear side, for a switch cabinet mounting, and, on its front side, has a third fastening element to which the contactor is fastenable with its underside.

7. The motor starter according to claim 1,
   wherein
   the motor circuit breaker has at least one current flow measuring device and a measuring and power supply circuit, fed on an input side by the at least one current flow measuring device, for supplying power to the electronic tripping device, and an actuator configured to actuate the switching contact or switching contacts of the motor circuit breaker.

8. A contactor configured for use in the motor starter according to claim 1, comprising:
   an interface for the at least one control line configured to transmit a control signal, the control signal being generated depending upon a switching signal for switching the contactor, to the electronic tripping device of the motor circuit breaker; and
   an electrical energy storage that is charged by the switching signal,
   wherein the interface has a terminal for an auxiliary power line between the motor circuit breaker and contactor, via which the electrical energy storage is configured to supply the electronic tripping device with energy.

9. The contactor according to claim 8,
   further comprising a programmable unit and control electronics, coupled to the programmable unit, configured to control one or more switching contacts of the contactor, depending upon the switching signal,
   wherein the programmable unit is configured to generate the control signal for the electronic tripping device, depending upon data of the control electronics for switching the switching contact or contacts of the contactor, and to transmit the control signal via the at least one control line, according to a predetermined data communication protocol, to a data interface, provided for data communication and coupled with the electronic tripping device, of the motor circuit breaker.

10. The contactor according to claim 8,
further comprising, per phase, at least one semiconductor switch as a switching contact, and/or
a fastening element on its front side to which the motor circuit breaker is fastenable with its underside.

* * * * *